United States Patent
Rohrbacher et al.

(10) Patent No.: US 6,578,714 B2
(45) Date of Patent: Jun. 17, 2003

(54) MOBILE WASHER WITH FLUID RECLAMATION SYSTEM

(75) Inventors: Richard D. Rohrbacher, Phoenix, AZ (US); Timothy P. Stahoviak, Peoria, AZ (US); Jacob M. Sonnett, Phoenix, AZ (US); Ben W. Jentink, Apache Junction, AZ (US); Richard S. Rohrbacher, Glendale, AZ (US)

(73) Assignee: Cyclone Surface Cleaning, Inc., Tempe, AZ (US)

( * ) Notice: Subject to any disclaimer, the term of this patent is extended or adjusted under 35 U.S.C. 154(b) by 145 days.

(21) Appl. No.: 09/755,732

(22) Filed: Jan. 5, 2001

(65) Prior Publication Data

US 2002/0088746 A1 Jul. 11, 2002

(51) Int. Cl.$^7$ .............................. B01D 33/04; B08B 3/14
(52) U.S. Cl. ........................ 210/387; 210/391; 210/396; 210/400; 134/110
(58) Field of Search ................................ 210/387, 391, 210/393, 396, 400, 407, 408, 181; 134/10, 110

(56) References Cited

U.S. PATENT DOCUMENTS

| | | | |
|---|---|---|---|
| 1,934,494 A | * 11/1933 | Gillespie | 134/7 |
| 3,712,476 A | * 1/1973 | Cohen-Alloro et al. | 210/387 |
| 3,784,018 A | 1/1974 | Hope et al. | |
| 3,920,530 A | * 11/1975 | Xylander | 205/757 |
| 3,931,012 A | * 1/1976 | Huse | 210/251 |
| 3,959,010 A | * 5/1976 | Thompson et al. | 134/21 |
| 3,959,135 A | * 5/1976 | Shattock | 210/350 |
| 4,285,816 A | 8/1981 | Lee | |
| 4,556,453 A | 12/1985 | Meinecke | |
| 4,692,240 A | * 9/1987 | Arbuthnot et al. | 209/254 |
| 5,259,952 A | 11/1993 | Lee | |
| 5,469,597 A | 11/1995 | Page | |
| 5,500,976 A | 3/1996 | Rohrbacher et al. | |
| 5,501,396 A | 3/1996 | Rohrbacher et al. | |
| 5,571,404 A | * 11/1996 | Derenthal | 210/97 |
| 5,601,659 A | 2/1997 | Rohrbacher | |
| 5,704,989 A | 1/1998 | Page | |
| 5,718,015 A | 2/1998 | Rohrbacher | |
| 5,826,298 A | 10/1998 | Rohrbacher et al. | |
| 5,921,399 A | 7/1999 | Bakula et al. | |
| 5,954,071 A | * 9/1999 | Magliocca | 134/109 |
| 6,129,099 A | 10/2000 | Foster et al. | |
| 6,398,877 B1 | * 6/2002 | Magliocca | 134/10 |

OTHER PUBLICATIONS

Copy of International Search Report from PCT Application No. PCT/US02/00210.

* cited by examiner

Primary Examiner—Fred Prince
(74) Attorney, Agent, or Firm—Brinks Hofer Gilson & Lione

(57) ABSTRACT

A fluid reclamation system is provided for separating large debris particles from a polluted fluid. The reclamation system includes a separation device with an endless screen installed onto driven cylinders. A basin is mounted within the screen for collecting the fluid after it passes through a top surface of the screen. A disposal mechanism discards large debris particles from the screen and discharges the large debris particles into a storage barrel.

28 Claims, 3 Drawing Sheets

MOBILE WASHER WITH FLUID RECLAMATION SYSTEM

BACKGROUND

The present invention relates generally to reclamation systems for separating pollutants from a fluid, and more particularly, to a separation device that separates large debris particles from a fluid.

Fluid reclamation systems for separating pollutants from a fluid are generally well known by those in the arts. One application in which reclamation of a fluid is especially important is mobile cyclonic power wash systems. As known by those skilled in the art of cleaning large, flat surfaces, mobile cyclonic washers have provided a significant advancement in cleaning technology over traditional cleaning methods. Throughout this disclosure the large, flat surfaces to be cleaned will be described generally, in a non-limiting manner, as airport runways and tarmacs, since mobile cyclonic washers have found significant commercial success in these applications. Traditionally, these types of surfaces have been cleaned with generic cleaning tools, such as high pressure sprayers and street sweepers. Thus, in a typical cleaning example, an operator sprays a fluid (usually water) on the airport runway with a high pressure sprayer to dislodge unwanted debris from the surface. Then, after the operator has completed an area, a street sweeping machine will follow to collect the residue from the surface. However, as those skilled in the art recognize, this method and those similar to it are considerably less efficient and controllable than mobile cyclonic wash systems.

Typically, a mobile cyclonic washer includes a retrieval unit that sprays fluid onto the surface at high pressure. The fluid cleans the surface by dislodging debris when the high velocity fluid strikes the surface. Contemporaneously, the retrieval unit recovers the fluid and dislodged matter and transports the polluted mixture to a mobile reclamation system. The reclamation system then separates the pollutants from the fluid and transports the cleaned fluid back to a storage tank where it can be reused by the retrieval unit.

The mobile cyclonic washer provides significant advantages over traditional cleaning methods. For example, one problem with traditional cleaning methods is that the high pressure sprayer randomly scatters the loosened debris across the runway surface, making it difficult to fully collect all the debris. In addition, the high pressure sprayer leaves fluid spread across the runway. This allows the polluted mixture to flow into drainage systems before it can be collected and also requires more drying time before the runway can be used again. The mobile cyclonic washer eliminates these problems by collecting virtually all of the polluted fluid immediately after loosening the debris, leaving the surface clean and dry. The mobile cyclonic washer also uses a smaller fluid reserve since the washer cleans and reuses the same fluid instead of leaving the fluid on the runway like traditional methods. In contrast, traditional methods usually require a large storage vehicle to provide a constant supply of fresh fluid to the high pressure sprayer. Furthermore, the mobile cyclonic washer cleans surfaces faster with less manpower because only a single pass is needed by the washer compared to multiple passes by a sprayer and a street sweeper with the traditional method.

Because the mobile cyclonic washer reuses its cleaning fluid, the capacity of the reclamation system has a substantial impact on the performance of the washer. Typically, a variety of debris and contaminants are collected from surfaces like airport runways. In order to properly clean the surface, it is particularly important that the reclamation system adequately separate these pollutants from the fluid before reuse to prevent the pollutants from being redeposited onto the surface. Thus, the speed of the separation process can have a direct impact on the area that can be cleaned within a given time. Faster separation also allows the washer to operate with less fluid in the system than is needed with slower separation processes.

One problem with most fluid reclamation systems used on current mobile cyclonic washers is the lack of a separate system for separating large debris particles from the polluted mixture. Typically, the polluted fluid mixture that is collected by the retrieval unit contains a substantial amount of large debris particles, such as rubber, grease, sand, dirt and metal. However, in many reclamation systems these particles are separated from the fluid by the same reclamation tank and filters that are also intended to separate small debris particles and chemical contaminants. As a result, the large debris particles quickly fill the reclamation tank and plug the filters, thus reducing the effectiveness of the reclamation system and the performance of the washer. Other systems have incorporated screens into the reclamation tank to filter out the large debris particles before the polluted mixture begins the usual separation process. However, this alternative has been ineffective because the screen quickly becomes plugged with the large debris particles. For example, in some trials with a screen such as this, the screen must be manually cleaned after every fifteen minutes of operation. Another problem with current reclamation systems is the inability to segregate and store the large debris particles. With current mobile cyclonic washers the large debris particles typically accumulate in the reclamation system during a particular cleaning job. Eventually, when the washer is no longer able to clean the surface adequately because of the excess debris in the reclamation system, the operator manually cleans the system in a labor intensive procedure. The owner of the washer then becomes responsible for disposing of the debris, which oftentimes includes hazardous materials requiring special disposal measures.

BRIEF SUMMARY

Accordingly, a reclamation system with a separation device is provided that separates large debris particles from a polluted mixture before a filtering system separates small debris particles from the fluid. The separation device includes an endless screen that rolls around rotatable cylinders. Fluid is spread across a top surface of the screen by a distributor. A basin collects the fluid and small debris particles that pass through the screen and discharges the fluid to the filtering system. A disposal mechanism with a rotating brush then discards the large debris particles from the screen and discharges the particles into a storage barrel.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION

Figure 1:
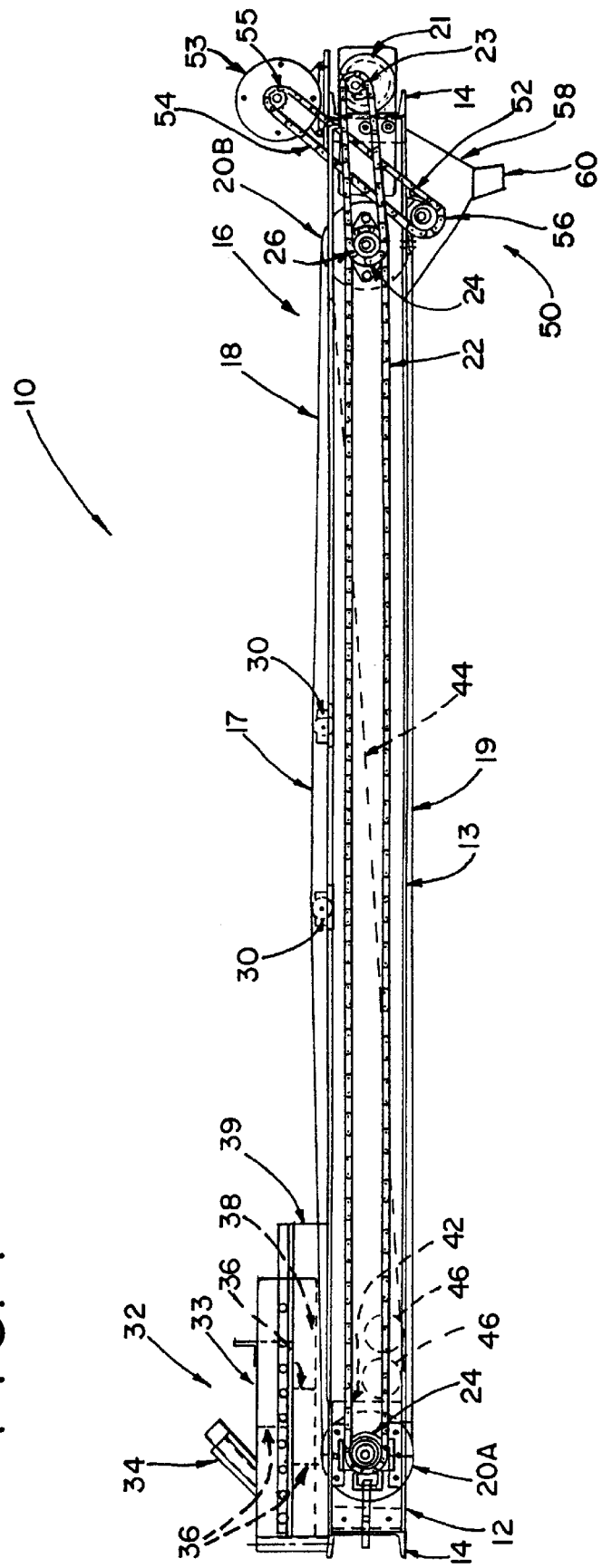
FIG. 1 is a side elevational view of a separation device.
Figure 2:
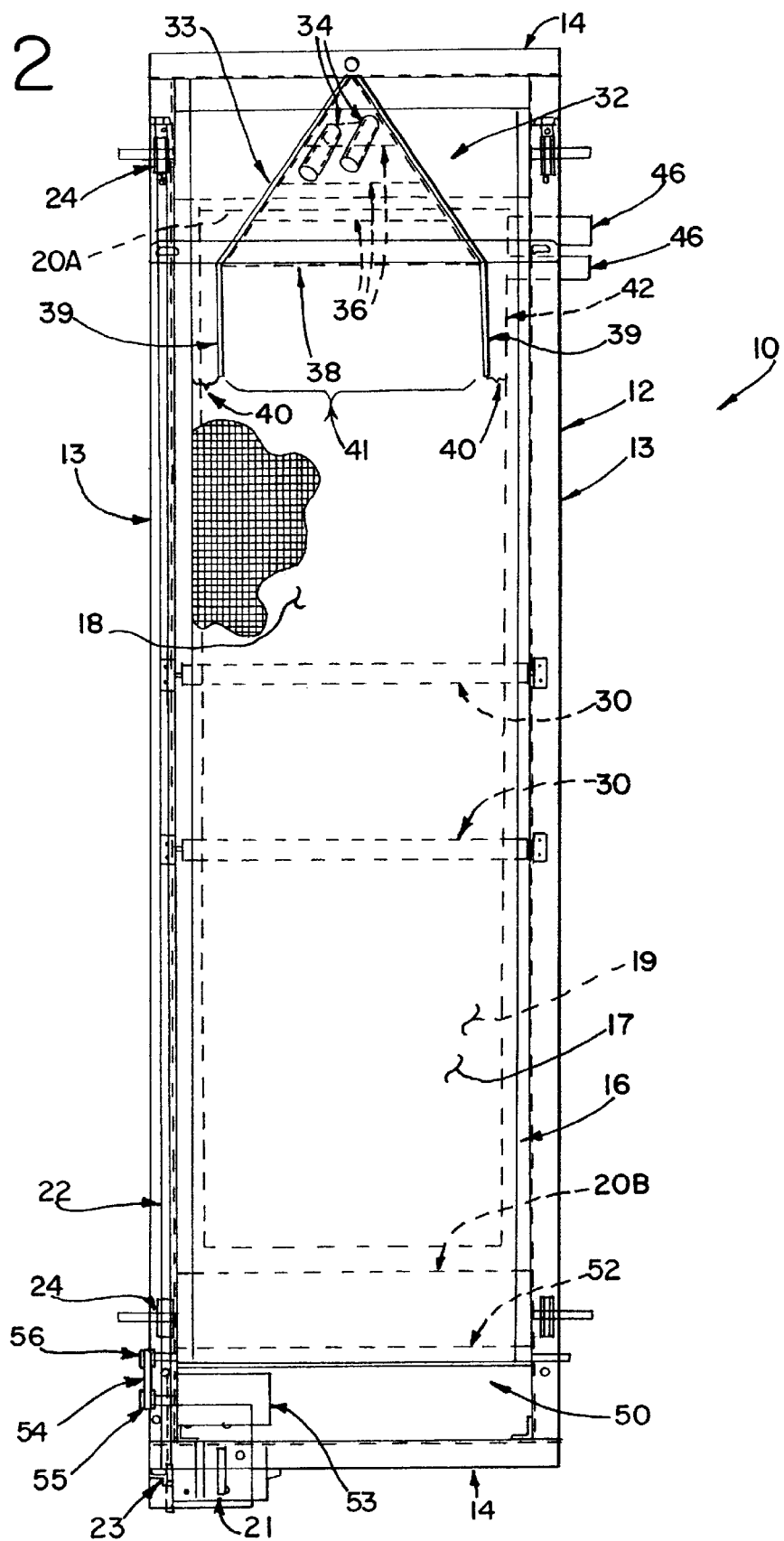
FIG. 2 is a top elevational view of the separation device.

Referring now to the drawings and particularly to FIGS. 1 and 2, a separation device 10 is provided for separating large debris particles from a fluid. Although the separation device 10 may be used in other applications, the separation device 10 is especially useful in fluid reclamation systems for mobile cyclonic washers as will be described below. Preferably, the separation device 10 includes a frame 12 to support the various separation mechanisms that will be described herein. The frame 12 also preferably includes mounting hardware (not indicated) suitable to mount the separation device 10 within a reclamation system. Accordingly, the frame 12 as provided includes side support beams 13 rigidly attached to lateral end support beams 14.

Mounted within the frame 12 is a rolling screen assembly 16. The rolling screen assembly 16 includes a mesh screen 18 that is joined at the ends to form an endless screen 18. Although a variety of mesh sizes can be used in the separation device 10, a range of mesh sizes between 5×5 and 300×300 Mesh are believed to be useful in a broad range of applications. Preferably, however, the mesh size will be within a range of 20×20 and 100×100 Mesh for separation devices 10 used in the reclamation systems 70 described below. The width of the endless screen 18 is about 24 inches. Preferably, the endless screen 18 is made from stainless steel to increase the operating life of the screen 18. The endless screen 18 is installed around two driven cylinders 20 that are rotatably attached to the side beams 13 and are positioned at opposite ends of the rolling screen assembly 16. Thus, when the cylinders 20 are rotated, the endless screen 18 continuously rolls around the cylinders 20. Accordingly, in the described embodiment (seen in FIG. 1) the top surface 17 of the rolling screen 18 travels from the left side to the right side, and the bottom surface 19 travels in the opposite direction.

The cylinders 20 may be made from a variety of materials, but a neoprene material has been shown to provide sufficient friction to drive the endless screen 18 while providing acceptable reliability. Preferably, the diameter of the cylinders 20 is about 5 inches. The cylinders 20 are powered by an electric motor 21 mounted to the frame 12 of the separation device 10. The electric motor 21 then rotates the cylinders 20 through a chain 22 that is installed onto a sprocket 23 at the electric motor 21 and sprockets 24 attached to each of the cylinders 20. The speed of the electric motor 21 may be increased or decreased depending on the needs of the particular application, but a speed that produces a screen 18 travel speed between 5 and 50 feet per minute has been found to be generally sufficient. A tensioning mechanism 26 is also preferably provided to maintain an adequate tension on the endless screen 18. Accordingly, the tension mechanism 26 is attached to the right cylinder 20B and can be adjusted with screws to move the right cylinder 20B relative to the side support beams 13 and the left cylinder 20A. Additionally, support rollers 30 are provided to support the top surface 17 of the endless screen 18. Preferably, two support rollers 30 are pivotally attached to the side beams 13 near the midsection of the endless screen 18. The support rollers 30 freely rotate as the endless screen 18 rolls, thus providing additional support for the weight of material that will be placed on the top surface 17 of the endless screen 18.

A distributor is provided along the top side 17 of the endless screen 18 near the left cylinder 20A to spread out polluted fluid across the top surface 17 of the endless screen 18. The distributor 32 includes input ports 34 that supply polluted fluid from the retrieval units 80 as will be described below. Preferably, the diameter of the input ports 34 is about 1 inch. The distributor 32 includes a housing 33 that entraps the incoming fluid. Installed within the interior of the housing 33 is a number of baffles 36 that impede the flow of fluid through the distributor 32. A distributor opening 38 is also provided along an opposite side of the housing 33 from the input ports 34. The distributor opening 38 extends across most of the width of the endless screen 18, leaving small margin areas 40 at each side of the screen 18. Side shields 39 are also provided to separate the margin areas 40 of the screen 18 from the central section 41 of the screen 18.

A basin 42 is mounted between the top surface 17 and the bottom surface 19 of the endless screen 18 to collect the fluid that passes through the top surface 17 of the screen 18. The basin 42 extends across most of the width of the endless screen 18 and between the two cylinders 20 across the length of the screen 18. Accordingly, the distributor opening 38 of the distributor 32 is located within the outer boundaries of the basin 42. The bottom surface 44 of the basin 42 is angled downward from the right side to the left side to direct incoming fluid toward the left side of the basin 42. Discharge ports 46 are also provided along the left side of the basin 42 for discharging the fluid from the basin 42. Preferably, the diameter of the discharge ports 46 is about 2 inches, or about twice the size of the input ports 34 of the distributor 32.

Along the right side of the separation device 10 is a disposal mechanism 50 for discarding debris from the top surface 17 of the endless screen 18. Preferably, the disposal mechanism 50 includes a rotating brush 52 pivotally attached to the side beams 13 and positioned to contact a lower surface of the screen 18 near the right cylinder 20B. Thus, the brush 52 extends across the width of the endless screen 18. A brush 52 with a diameter about 2 inches and with nylon bristles has been shown to perform sufficiently. A brush 52 such as this can be obtained from the company named Felton Brush under the product name 2 inch round nylon. The brush 52 is powered by an electric motor 53 and a chain 54 that is installed on a sprocket 55 attached to the electric motor 53 and another sprocket 56 attached to the brush 52. Accordingly, the brush 52 rotates in an opposite direction as the right cylinder 20B. The brush 52 can be operated in a range of acceptable speeds, including 25 to 1000 rpm, but a speed of 500 rpm is preferable. A housing 58 is also provided that surrounds the brush 52 and the right side of the endless screen 18. Accordingly, the housing 58 traps debris that is discarded from the screen 18 by the brush 52. Preferably, the housing 58 includes a downward facing discharge opening 60 along the bottom side of the housing 58 to let debris exit the disposal mechanism 50 under gravity flow.

The operation of the separation device 10 is now apparent to those skilled in the art. Polluted fluid is supplied to the input ports 34, for example, from a retrieval unit 80 like the one in the mobile cyclonic washer 72 that will be described below. The polluted fluid then fills the housing 33 of the distributor 32, and the fluid flow through the distributor 32 is impeded by the baffles 36. Thus, the flow of polluted fluid out of the distributor opening 38 is evenly spread out across the width of the central section 41 of the endless screen 18. The side shields 39 also help to keep the discharged fluid away from the margin areas 40 of the endless screen 18.

The fluid then passes through the screen 18, while larger debris particles that can not fit through the mesh of the screen 18 remain on the top surface 17 of the screen 18. The fluid that passes through the screen 18 now contains only small pollutants since all of the large debris particles that were mixed in the fluid have been separated. As those skilled in the art recognize, the proportion of large debris particles remaining on the screen 18 compared to the small pollutants passing through the screen 18 can be adjusted by using endless screens 18 with different mesh sizes. The basin 42 then collects the fluid that passes through the screen 18 and directs the fluid to the left side of the basin 42 where it is discharged through the discharge ports 46.

A mat of large debris particles is now evenly spread across the central section 41 of the endless screen 18. This mat is transported along the top surface 17 of the endless screen 18 toward the right side of the separation device 10. The disposal mechanism 50 then removes the mat of debris particles from the endless screen 18. Some of the debris particles fall off the screen 18 before reaching the brush 52 when the screen rotates down and around the right cylinder 20B. The remaining debris particles that stick to the screen 18 are then removed by the rotating brush 52. As a result, no debris is left on the bottom surface of the endless screen 18 when it exits the disposal mechanism 50. The housing 58 of the disposal mechanism 50 then collects the debris particles and discharges the debris particles through the discharge opening 60.

Figure 3:
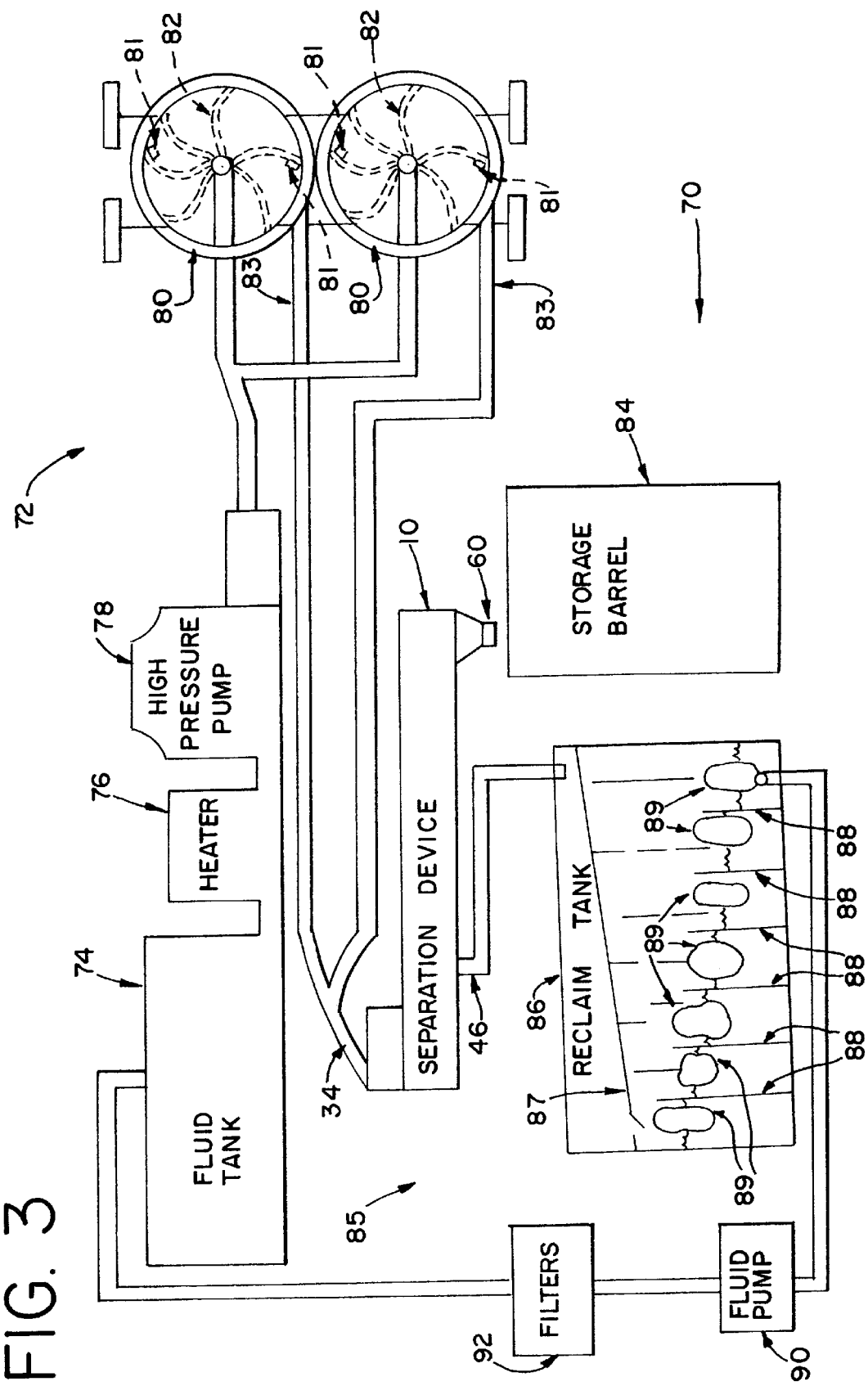
FIG. 3 is a schematic diagram of a fluid reclamation system using the separation device.

Turning now to FIG. 3, a reclamation system 70 using the separation device 10 is provided. This reclamation system 70 has been proven to be especially useful in mobile cyclonic washing systems 72. Fluid is stored in the mobile cyclonic washer 72 in a fluid tank 74. Various fluids could be used, but usually water is used in these types of washers 72. The fluid is routed from the fluid tank 74 to a heater 76 and a high pressure pump 78 which provide the heat and pressure necessary for adequate cleaning of the surface. The fluid is then routed to retrieval units 80. A variety of retrieval units 80 can be used, but the described embodiment includes two retrieval units 80 positioned side-by-side. The retrieval units 80 can then be pulled by an automotive vehicle (not shown) to provide a wide cleaning swath. This configuration is particularly useful when cleaning airport runways. The retrieval units 80 spray the high pressure fluid downward onto the surface to be cleaned through spray nozzles 81, thus dislodging debris from the surface. Motors (not shown) are also provided to spin the blades 82 and the nozzles 81 of the retrieval units 80. As a result, the spinning rearward-swept blades 82 suck up the fluid after being sprayed and the dislodged debris that results. The polluted fluid is then discharged from the retrieval units 80 into discharge conduits 83.

The discharge conduits 83 are connected to the input ports 34 of the separation device 10. Accordingly, the separation device 10 separates out the large debris particles from the polluted fluid as previously described. Preferably, the separation device 10 is positioned within the reclamation system 70 to allow the large debris particles to exit the discharge opening 60 under gravity flow. The large debris particles then fall into a storage barrel 84, or container 84. Typically, a storage barrel 84 with a capacity of about 55 gal. is preferred. Sensors (not shown) may be provided to monitor the level of debris in the storage barrel 84, but a regular visual inspection is also adequate.

Preferably, the separation device 10 is also located so that the fluid from the basin 42 exits the discharge ports 46 and passes to a filtering system 85 under gravity flow. The filtering system 85 further cleans the fluid by removing the remaining small debris particles. Accordingly, the fluid travels down an angled surface 87 in the reclaim tank 86 and passes down into a series of cascading baffles 88. As a result, the small debris particles collect at the bottom of the reclaim tank 86 between the baffles 88. Preferably, hydrocarbon absorbing bags 89 are also included between the baffles 88 to remove hydrocarbons from the fluid. Once the fluid reaches the right side of the reclaim tank 86, most of the small debris particles have been removed from the fluid. Next, a fluid pump 90 pumps the fluid from the right side of the reclaim tank 86 through a series of finishing filters 92. The fluid, which is now cleaned and ready for reuse, is then returned to the fluid tank 74.

As is readily apparent, the described reclamation system 70 offers a number of advantages over other cleaning systems. One significant advantage is that the large debris particles can be segregated and stored easily during a cleaning job. As a result, the operator of the washer 72 can return the barrels 84 of debris to the owner of the cleaned surface after the cleaning job is completed. Thus, responsibility for final disposal of the debris remains with the owner of the surface instead of being transferred to the operator of the washer 72. This is especially important when the debris might include hazardous materials that require expensive disposal measures. The ability to return the debris to the owner is also important because of the large amount of material that can be collected in some applications. For example, in the case of cleaning airport runways, as many as ten to sixteen barrels 84 of debris can be collected from a runway of a million square feet in size. This would impose a large and expensive burden on the operator of the washer 72 if the responsibility for final disposal is shifted away from the airport owner.

The reclamation system 70 also allows the operator to clean large areas faster then is possible with other washers. Accordingly, in the airport runway example, a single operator can typically clean an area of 100,000 $ft^2$ in one eight hour shift. During this eight hour shift, between one and two barrels 84 of debris can be collected. Consequently, the time required to replace the filled barrels 84 with new, empty barrels 84 can be as short as a few minutes. In contrast, in other washers that rely on fixed filters, the operator has to frequently stop the cleaning operation so that the filters can be cleaned.

Moreover, the reclamation system 70 requires far less fluid to provide an adequate supply to the retrieval units 80 than other systems. For example, in a typical mobile cyclonic washer 72 using the described reclamation system 70, as little as 1,000 gal. of fluid is needed. During one eight hour shift, only about 100 gal. of fluid is usually left by the washer 72 on the surface. Thus, a mobile cyclonic washer 72 with the described reclamation system 70 is particularly efficient in the use and storage of the cleaning fluid. As previously described, traditional systems require considerably more fluid since the fluid is sprayed and left on the surface. However, even in the current systems that do recover fluid, much more fluid must be provided because large settling tanks are typically used to clean the fluid.

The reclamation system 70 also minimizes the need for fluid pumps and eliminates the need for vacuum pump. As described, a single fluid pump 90 (besides the high pressure pump 78) is required to direct the fluid through the reclamation system 70. Accordingly, gravity flow is used to separate the large debris particles in the separation device 10 and for discharging these particles into the storage barrel 84. Gravity flow is also used to direct the fluid to the reclamation tank 86 and for the separation process that occurs in the reclamation tank 86. In contrast, some reclamation systems rely on fluid pumps and vacuum pumps to force the fluid through the reclamation system. However, one disadvantage of these systems is that the pumps cause the pollutants to more fully mix with the fluid, making separation more difficult. The additional pumps also increase the cost of the reclamation system and reduce the reliability of the washer since the pumps may fail after prolonged use. Furthermore, the noise level of the washer is reduced by minimizing the number of pumps that are used since fluid and vacuum pumps and their related power sources are typically large contributors of noise.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A mobile power washer for cleaning surfaces, comprising:
   a fluid tank;
   a high pressure pump connected to said fluid tank and generating high pressure fluid;
   a retrieval unit connected to said high pressure pump comprising a nozzle disposed to spray said high pressure fluid; and a retrieval unit discharge adapted to collect a polluted fluid of said high pressure fluid and debris dislodged by said high pressure fluid;
   a separation device connected to said retrieval unit discharge adapted to separate large debris particles from said polluted fluid, comprising: an endless screen installed upon rotatable cylinders; a distributor disposed above said screen adapted to discharge said polluted fluid onto said screen; a drive source adapted to rotate said cylinders; a basin disposed below said screen adapted to collect separated fluid passing through said screen; a disposal mechanism adapted to discard said large debris particles disposed on said screen; a discharge opening disposed to discharge said large debris particles; and a discharge port disposed to discharge said separated fluid after passing through said screen;
   a container connected to said discharge opening disposed to receive said large debris particles;
   a filtering system connected to said discharge port disposed to receive said fluid, said filtering system being adapted to filter small debris particles from said fluid; said fluid tank being connected to said filtering system and receiving filtered fluid after said small debris particles are filtered therefrom.

2. The mobile power washer according to claim 1, wherein the mesh size of said screen is between 20×20 and 100×100 Mesh.

3. The mobile power washer according to claim 2, wherein said screen travels at a speed between 10 and 50 feet per minute.

4. The mobile power washer according to claim 3, wherein said screen is about 24 inches wide.

5. The mobile power washer according to claim 1, wherein said disposal mechanism comprises a brush contacting said screen and extending across a width of said screen.

6. The mobile power washer according to claim 5, wherein said brush rotates in an opposite direction as said screen.

7. The mobile power washer according to claim 6, wherein said brush rotates between 25 and 1000 rpm.

8. The mobile power washer according to claim 6, further comprising an electric motor driving said brush, wherein a chain is installed onto a sprocket attached to said electric motor and a sprocket attached to said brush.

9. The mobile power washer according to claim 5, wherein said brush is disposed along a bottom surface of one of said cylinders oppositely disposed from said distributor.

10. The mobile power washer according to claim 9, wherein said disposal mechanism comprises a housing entrapping debris discarded by said brush, said housing including said discharge opening facing downward for discharging said discarded debris out of said separation device under gravity flow.

11. The mobile power washer according to claim 1, wherein said distributor comprises an input port, and a distributor opening extending across a majority width of said screen thereby spreading said fluid across a central section of said screen and not margin areas of said screen.

12. The mobile power washer according to claim 11, wherein said distributor further comprises side shields keeping said fluid within said central section and away from said margin areas.

13. The mobile power washer according to claim 1, wherein said distributor comprises a housing entrapping said polluted fluid, said housing comprising baffles impeding the flow of said fluid thereby producing an even spread of fluid at a distributor opening.

14. The mobile power washer according to claim 1, further comprising a frame comprising side beams disposed outside a width of said screen and lateral end beams rigidly attached to said side beams disposed along opposite ends of said screen.

15. The mobile power washer according to claim 1, further comprising support rollers disposed between said cylinders and under a top surface of said screen thereby supporting a weight placed on said top surface.

16. The mobile power washer according to claim 1, wherein said basin comprises said discharge port disposed below and near said distributor, and a bottom surface angled downward toward said discharge port, thereby directing said fluid to said discharge port and discharging said fluid from said separation device.

17. The mobile power washer according to claim 1, further comprising an electric motor driving said cylinders, wherein a chain is installed onto a sprocket attached to said electric motor and sprockets attached to said cylinders.

18. The mobile power washer according to claim 17, further comprising a tension mechanism adjustable to move one of said cylinders relative to another of said cylinders.

19. The mobile power washer according to claim 1, wherein said disposal mechanism comprises a brush contacting said screen and extending across a width of said screen, said brush rotating in an opposite direction as said screen; wherein said distributor comprises an input port, and a distributor opening extending across a majority width of said screen thereby spreading said fluid across a central section of said screen and not margin areas of said screen; said distributor further comprising a housing entrapping said polluted fluid, said housing comprising baffles restricting the flow of said fluid thereby producing an even spread of fluid at said distributor opening; and further comprising support rollers disposed between said cylinders and under a top surface of said screen thereby supporting a weight placed on said top surface.

20. The mobile power washer according to claim 19, further comprising an electric motor driving said brush, wherein a chain is installed onto a sprocket attached to said brush electric motor and a sprocket attached to said brush; wherein said brush is disposed along a bottom surface of one of said cylinders oppositely disposed from said distributor; wherein said disposal mechanism comprises a housing entrapping debris discarded by said brush, said housing including said discharge opening facing downward for discharging said discarded debris out of said separation device under gravity flow; wherein said distributor further comprises side shields keeping said fluid within said central section and away from said margin areas; further comprising a frame comprising side beams disposed outside a width of said screen and lateral end beams rigidly attached to said side beams disposed along opposite ends of said screen; and wherein said basin comprises said discharge port disposed below and near said distributor, and a bottom surface angled downward toward said discharge port, thereby directing said fluid to said discharge port and discharging said fluid from said separation device.

21. The mobile power washer according to claim 19, wherein the mesh size of said screen is between 5×5 and 300×300 Mesh; wherein said screen travels at a speed between 5 and 50 feet per minute; and wherein said brush rotates between 25 and 1000 rpm.

22. The mobile power washer according to claim 1, wherein said filtering system comprises a reclaim tank comprising cascading baffles, a fluid pump disposed to pump said fluid from said reclaim tank, and a filter disposed to receive said fluid from said fluid pump.

23. The mobile power washer according to claim 1, further comprising a basin disposed below said screen adapted to collect said separated fluid passing through said screen, said basin being connected to said discharge port thereby discharging said fluid to said filtering system.

24. The mobile power washer according to claim 23, wherein said disposal mechanism comprises a brush contacting said screen and extending across a width of said screen, wherein said brush rotates in an opposite direction as said screen.

25. The mobile power washer according to claim 24, wherein said filtering system comprises a reclaim tank comprising cascading baffles, a fluid pump disposed to pump said fluid from said reclaim tank, and a filter disposed to receive said fluid from said fluid pump.

26. The mobile power washer according to claim 25, wherein the mesh size of said screen is between 5×5 and 300×300 Mesh.

27. The mobile power washer according to claim 25, wherein said brush is disposed along a bottom surface of one of said cylinders oppositely disposed from an input port; and wherein said disposal mechanism comprises a housing entrapping debris discarded by said brush, said housing forming said discharge opening, wherein said discharge opening faces downward thereby discharging said discarded debris into said container under gravity flow.

28. The mobile power washer according to claim 27, wherein said distributor comprises a distributor opening extending across a majority width of said screen thereby spreading said fluid across a central section of said screen and not margin areas of said screen; wherein said distributor further comprises side shields keeping said fluid within said central section and away from said margin areas; and wherein said distributor further comprises a housing entrapping said polluted fluid, said housing comprising baffles impeding the flow of said fluid thereby producing an even spread of fluid at said distributor opening.

* * * * *